United States Patent [19]

Stock

[11] Patent Number: 5,074,735

[45] Date of Patent: Dec. 24, 1991

[54] WICKETING APPARATUS

[75] Inventor: David K. Stock, Green Bay, Wis.

[73] Assignee: Amplas, Inc., Green Bay, Wis.

[21] Appl. No.: 579,882

[22] Filed: Sep. 7, 1990

[51] Int. Cl.[5] .......... B65G 57/00

[52] U.S. Cl. .......... 414/27; 414/790.4; 414/791.1; 414/793; 414/900; 414/908; 271/223; 198/692

[58] Field of Search .......... 414/27, 788.1, 790.9, 414/790.4, 791.1, 793, 793.9, 900, 908; 198/692, 693; 271/223

[56] References Cited

U.S. PATENT DOCUMENTS

| | | | |
|---|---|---|---|
| 2,857,035 | 10/1958 | Gagnon | 198/19 |
| 3,431,828 | 3/1969 | Crawford et al. | 93/13 |
| 3,555,977 | 1/1971 | Saumsiegle | 414/27 X |
| 3,625,338 | 12/1971 | Cawley | 414/27 X |
| 3,633,731 | 1/1972 | Jones | 414/793 X |
| 3,714,757 | 2/1973 | Feigel et al. | 53/75 |
| 4,195,540 | 4/1980 | Franks | 83/95 |
| 4,252,233 | 2/1981 | Joice | 414/790.4 X |
| 4,260,147 | 4/1981 | Houle et al. | 271/182 |
| 4,286,907 | 9/1981 | Houle et al. | 414/793 |
| 4,451,249 | 5/1984 | deBin | 493/204 |
| 4,547,111 | 10/1985 | Achelpohl | 414/27 |
| 4,573,955 | 3/1986 | Mory et al. | 414/793 X |
| 4,668,158 | 5/1987 | Sample et al. | 414/793 X |
| 4,693,701 | 9/1987 | deBin | 414/790.4 X |
| 4,954,033 | 9/1990 | Sanders | 414/27 |

*Primary Examiner*—David A. Bucci
*Assistant Examiner*—Craig Slavin
*Attorney, Agent, or Firm*—Andrus, Sceales, Starke & Sawall

[57] ABSTRACT

A wicket post mounting in a bag stacking machine includes a base unit bolted to a conveyor plate. The base unit includes an upstanding wall with a plurality of machined, vertical post receptacles or openings. Each receptacle is identical to receive and physically support one post in precise accurate relation to a longitudinal location on the station plate of a second post. The spacing of the receptacles and posts is selected to receive bags with spaced holes. A releasable latch pin is secured to each receptacle. The pin projects into an appropriate opening in the post and locks the post in the receptacle. The base unit may include a pair of post mounting bases each having an offset edge wall abutting the station plate to accurately locate the base. Bolts pass through the mounting base into threaded holes in the station. Each base has two spaced receptacles, providing for post spacing of 4, 5 and 6 inches. The receptacles tilt the post slightly outwardly and each receptacle has a back slot of a circumferential width less than that of the post and each post has an aligned back recess. Alternately, a single base is slightly greater in length than maximum post spacing. A plurality of finished receptacles are in the one mounting wall.

14 Claims, 2 Drawing Sheets

WICKETING APPARATUS

BACKGROUND OF THE INVENTION

This invention relates to wicketing apparatus and particularly to an adjustable wicket post unit for accurate assembly of product.

In forming of bags and like individual articles of plastic and the like flexible materials, a stream of the members are formed and then assembled in stacked relation for subsequent storage, shipment, or other processing. The members or articles may be formed with appropriate spaced holes and processed through a wicketing apparatus in which the members are rotated into stacked relation onto a wicket indexing conveyor unit. The indexing conveyor unit generally includes pairs of spaced locating members such as vertically upstanding wicket posts or pins, spaced in accordance with the spacement of the holes in each article. The articles are dropped onto the posts to align the bags into a neat stack of superimposed articles. For continuous mass production, the wicket unit includes an integrated indexing conveyor chain with a series of the dual-post sets secured thereto. Upon forming of a desired stack, the conveyor is stepped to move a finished stack from the alignment with the wicket wheel and repositions a set of posts in appropriate alignment with the incoming stream of articles. The article forming line may, of course, be constructed to form articles of different shapes and configurations, and particularly with different spaced stacking openings or holes in the articles. The wicket unit is therefore preferably provided with an adjustable post support system, or with replacement post units for accommodating different stacking hole spacement which are encountered in various article designs. The spacement generally varies in known and equal integral distances.

A standard available system for pin or post adjustment includes a separate mounting plate secured at each station of an endless chain conveyor or other conveying unit. The plate includes a plurality of longitudinally spaced threaded openings. The post unit for each station plate includes a base plate and a wicket post which may be integrally formed with the base plate. Each base plate includes a pair of spaced openings or apertures for alignment with adjacent threaded openings. A bolt member is provided for fixedly clamping of the base and thereby the posts to appropriate threaded openings. By attachment to selected threaded openings, the desired spacing of the posts is provided. Generally, for ease of assembly and the like, certain tolerances, of course, are inherent in the construction of the threaded opening as well as the interconnecting plate or mounting base openings and the clamping bolt. Although the system provides an adjustable post support, it has been found that the accuracy of post alignment is less than that desired and is highly dependent upon the careful attention and adjustment of the base members to provide a desired pin location.

Other systems permitting adjustment have been suggested. For example, U.S. Pat. No. 4,252,233 which issued Feb. 24, 1981 discloses a system having a base plate with an integral post and mounted to a station or index plate by a top clamp bar bolted to the station plate, with a slot and projection coupling permitting transverse and longitudinal location of the individual pins to the station or index plates prior to tightening of the clamp bar. This provides for essentially infinite adjustment of the pin location. However, the system would require careful attention of the operator making the adjustments. The patent discloses a special gauge device for use in locating of the posts. In the absence of such a gauge, or failure of the set-up personnel to use the gauge, the post setting will be highly dependent on the skill and care of the operator.

Generally, the task of setting the post sets on the commercial indexing conveyors has been considered a time consuming and costly, as well as a rather tiresome task, thus tending to require a motivated operator to provide the desired results. Although the prior art has suggested various adjustable systems for wicketing apparatus, there remains a need for a reliable, low-cost and rapidly positioned system for adjusting a wicketing apparatus to various applications.

SUMMARY OF THE PRESENT INVENTION

The present invention is particularly directed to an improved and simplified wicket pin or post mounting assembly for accurate location of the posts relative to a desired spacing with a minimum requirement of skill and attention applied to the post setting task. Generally, in accordance with the teaching of the present invention, a conveyor mounting base unit is fixedly secured in fixed relation to the index support such as a station plate. The mounting base unit has a plurality of machined and accurately formed and spaced vertical post supports, preferably in the form of vertically-oriented openings or receptacles. Each support is accurately formed to receive and physically support an accurately formed post in precise accurate relation to a longitudinal location on the plate and to a second post mounted too in a spaced post support. The spacing of the supports, such as the receptacles, thus accurately space the posts for receiving the bags. A releasable latch unit preferably secures each post to the selected receptacle to permit the rapid and releasable attachment of the posts in a location. For example, a simple spring-loaded detent pin provides a simple but effective latch. The detent pin is conveniently formed to project into an appropriate opening in the post and thereby to lock the post within the receptacle. Releasable units merely provide a means of maintaining the posts in the desired receptacle and do not affect the particular location of the pins with respect to the conveying station plate and/or the conveying mechanism. When the posts are moved to set or change the spacing, there is no change required in the pin receptacle or support and the posts are located and maintained in accurate and precise desired location to receive the bags as a result of the properly constructed fixed receptacle and movable pins or posts.

More particularly, in one preferred embodiment, the station plate is formed in a conventional manner and includes at least an outer accurately formed edge surface. A pair of post mounting plates are provided, each having a complementing L-shaped recess or offset edge wall for abutment to the station plate edge. The station plate has threaded holes formed therein and bolt means pass through the mounting base to fixedly secure the mounting base to the plate. The mounting base includes an offset upstanding wall projecting upwardly and adjacent to the outer mounting edge of the station plate. A plurality of vertical openings are machined or otherwise accurately formed into the outer face of the mounting wall. In a practical construction, each base wall is formed with a spaced receptacle providing for post spacing of 4, 5 and 6 inches. In a preferred construction, the individual openings are formed with a slight incline to tilt the post slightly outwardly of the mounting plate. Each opening is also provided with an outer slot structure of a circumferential width less than that of the post to permit the insertion of a wicket into the prepunched wicket holes in the bags stacked on the wicket posts. The post is similarly formed with a recessed back face creating a generally convex cross-section. A latch hole is provided within the lower post portion of the post which is to project into the receptacle. With the post located in the receptacle, the post hole is aligned with a clamp hole in the base wall. A spring-loaded detent pin is mounted within the clamp hole, and the pin retracted during the insertion of the wicket post and then released to move the pin into locking engagement within the locking hole. The two mounting plates each have the two spaced receptacles providing for the post spacing of 4, 5 and 6 inches.

In an alternate embodiment, a single mounting base is provided having a guide wall for fixed connection to the edge of the station plate. The length of the mounting base has a mounting wall at least slightly greater than maximum wicket pin or post spacing. A plurality of like-receptacles are formed as highly-finished receptacles within the mounting wall. The posts can then be appropriately inserted within the desired receptacles, preferably with suitable interlocking means to positively lock the posts into the mounting wall in appropriately spaced relation.

Thus, the present invention provides a multi-post base structure secured in fixed relation to an indexing conveyor and having a plurality of separate precisely formed and located like post supports.

The present invention has been found to provide a relatively low-cost and highly effective adjustable wicket post mounting unit and system which can be rapidly and accurately set by personnel with minimum skill and attention. Thus, the base plate structure is fixed in place which avoids the most common source of greatest misalignment in prior art units which require loosening the plate attachment screws and relocating the mounting plate and again tightening the attachment screws.

BRIEF DESCRIPTION OF DRAWINGS

The drawings illustrate the best mode presently contemplated of carrying out the invention.

In the drawings.

DESCRIPTION OF ILLUSTRATED EMBODIMENTS

Figure 1:
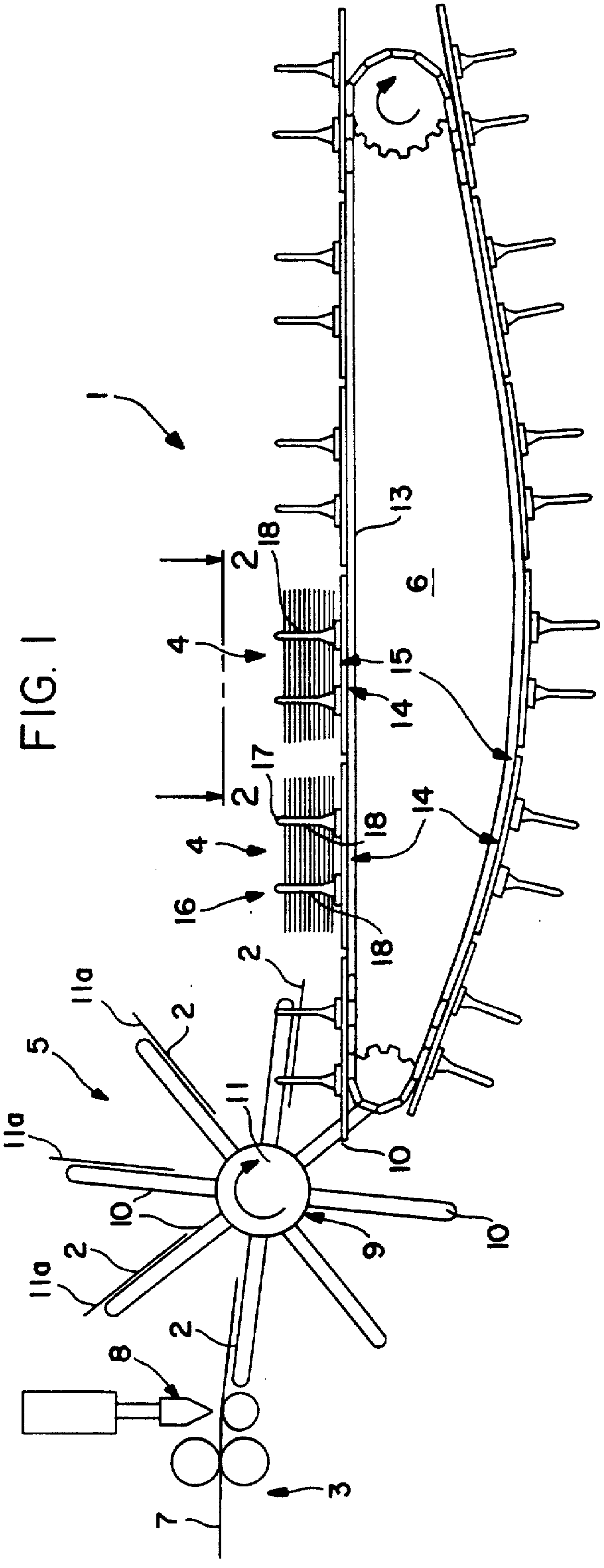
FIG. 1 is a simplified side elevational view of a bag wicketing line incorporating an embodiment of the present invention.

Referring to the drawings and particularly to FIG. 1, a bag stacking unit 1 is illustrated for receiving a stream of plastic bags 2 from a bag forming machine 3. Unit 1 forms successive stacks 4 of bags 2. A transfer unit 5 transfers the bags from the stream of incoming bags 2 onto an indexing conveyor 6. The bag forming machine 3 and the transfers unit 5 may be of any suitable or known construction. Thus, the bag forming machine 3 may receive an incoming folded web 7, with a heat sealing knife unit 8 selectively severing the incoming web to form the stream of individual bags 2 which are then passed into the transfer unit 5. The unit 5 is diagrammatically illustrated as a well-known unit having a rotating wheel 9 with its axis of rotation fixed and normal to the path of the bag stream. A plurality of laterally aligned pairs of arms 10 are secured to a rotating hub 11. The arms 10 project radially outwardly to define a supporting surface generally of a sufficient width to receive and support a bag 2 with the outermost sides or ends of the bag projecting outwardly of the post as at 11*a*. The arms 10 are spaced to support the bag with the outer side edge of the bag 2 extending laterally of the one arm 10. Rotation of the wheel 9 is correlated with the cycle time of the bag forming machine 3 to align an arm unit with each incoming bag 2. The rotating arms rotate the bag 2 from the incoming stream onto conveyor 6 to sequentially and successively transfer each formed bag 2 to the indexing conveyor 6. In conventional practice, the arms 10 are tubular members with surface openings, not shown. The arms 10 are coupled to a vacuum source, not shown, to firmly secure the bag to the arms during the rotation to the indexing conveyor 6. The arms 10 rotate through essentially 180 degrees and locate the bag 2 beneath the surface of the arms as a result of the rotation. At that point, the vacuum is released from the arm 10, and the bag 2 is thereby released and drops onto an aligned stacking unit 1 of the indexing conveyor 6.

The indexing conveyor 6 as illustrated is of a basically known construction and includes an endless conveyor construction with a pair of spaced, endless support chains 13. A plurality of stations 14 are all similarly formed and secured in longitudinally spaced relation to the chains of the index conveyor 6 for sequential alignment with the wicket arms 10. Each station 14 is similarly constructed and includes a supporting plate structure 15 fixed to the conveyor chain 13. In accordance with conventional practice, a pair of wicket posts 16 and 17 are secured to plate structure 15 in longitudinally spaced relation to each other in accordance with spaced holes 18 in the edge portion of each bag 2. The indexed conveyor 6 is controlled in accordance with the operation of transfer unit 5 such that after a predetermined number of bags 2 have been transferred onto the aligned station 14, the indexing conveyor 6 steps one step to move the aligned station 14 from the transfer arms 10 and simultaneously to move a new station 14 into alignment with the arms 10 to receive a succeeding and selected number of bags 2.

Generally the bag forming unit 3, the transfer unit 5, and the basic construction of the indexing conveyor 6 are shown in accordance with well-known constructions. These elements may be of any known or desired construction and no further description is given other than as necessary to full and clear understanding of the present invention. The present invention is particularly directed to the mounting of the wicket posts 16 and 17 to the support structure, such as the plate structure 15, and particularly providing for variation in the spacing of the wicket posts 16 and 17 to accommodate various standard bags 2 in which the spacing of the prepunched holes 18 is different.

Figure 2:
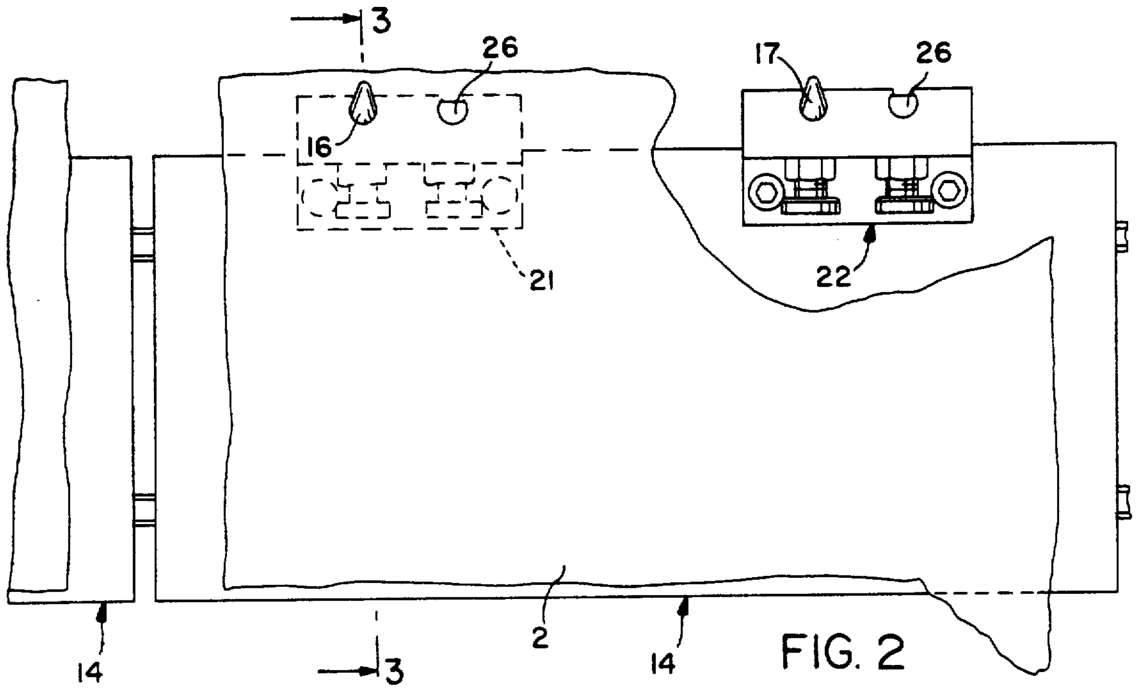
FIG. 2 is an enlarged top view illustrating a station of the machine shown in FIG. 1 and clearly illustrating an embodiment of the present invention shown in FIG. 1.
Figure 3:
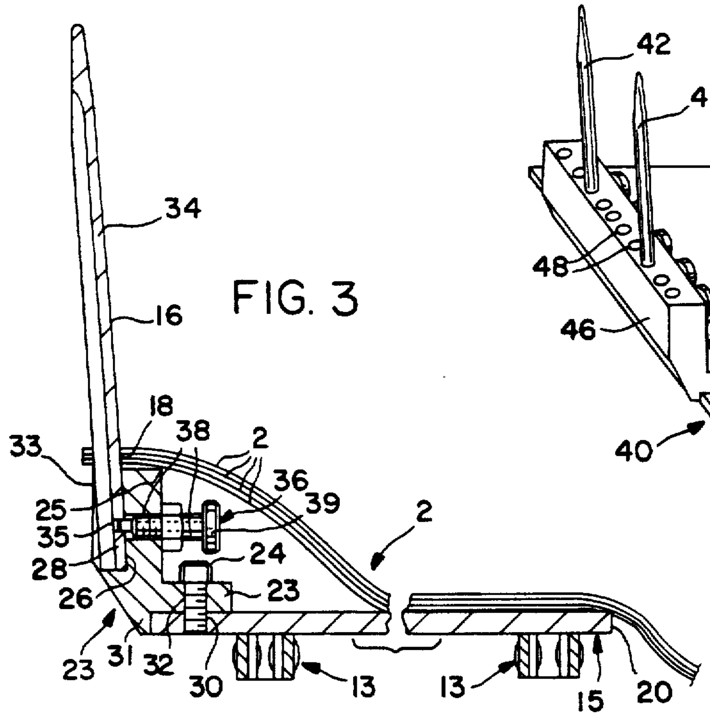
FIG. 3 is an enlarged sectional view taken generally on line 3—3 of FIG. 2.

Referring particularly to FIG. 2 and 3, the station plate structure 15 is shown as a generally conventional rectangular plate 20 having a length in excess of the length of the bag and a width less than the width of a bag. The plate 20 is shown fixedly attached to the pair of laterally spaced chains 13 of the index conveyor 6. The edges of the plate 20 project laterally of the conveyor chains, and the wicket posts 16 and 17 are specially mounted along the one outer longitudinal edge of the conveyor plate 20 on a mount unit 21 and 22, respectively. The plate 20 is located to align the posts 16 and 17 along a longitudinal line aligned with the prepunched openings or holes 18 in the bag 2. The posts 16 and 17 are further spaced longitudinally in accordance with the spacing of the holes 18.

In the illustrated embodiment of FIG. 2 and 3, each post 16 and 17 is separately mounted by the mount unit 21 and 22, respectively, to the station plate 20, and each unit 21 and 22 is shown identically constructed. With each of the post units identically constructed, the one unit is described in detail with corresponding elements of the other post unit identified by corresponding prime number for simplicity and clarity of explanation.

Referring to the post unit 21 shown to the left in FIG. 2, the unit 21 includes a mounting base 23 which is secured to the plate 20, shown attached by longitudinally spaced clamping bolts 24. The base 23 includes an upstanding outer wall 25 with a pair of longitudinally spaced receptacles 26 and 27, each of which is also identically constructed as an accurately finished opening. The wicket post 16 has a base portion 28 which is accurately finished to fit closely within any of the receptacles 26. The pair of receptacles 26 and 27 allows the longitudinal spacing of the post 16 within unit 21, and thereby the station plate 20. The receptacle selection provides adjustable spacing of the post 16 relative to post 17. The combination of the two units 21 and 22, each with two receptacles 26 and 27 establishes a variation for three different hole spacings.

In accordance with standard spacing practice of punched holes, the receptacles 26 are formed on one-inch centers. The illustrated system thereby provides for varying of the spacement of the posts in inch steps between three different inch spacings. For example, with the base units secured to the plate and the posts 16 and 17 in the most immediate adjacent receptacles 26 and 27, a spacing of three-inches is provided. The other combinations of the two opening in each unit 21 and 22 will provide for spacing of 4 or 5 inches by appropriate relocation of the posts 16 and 17 in the other receptacles 26.

By the precise conforming of the receptacles 26 with respect to each other and with respect to the attachment of the base units 21 to the plate 20, relocating of the posts 16 and 17, with the receptacle-matching base portions 28, automatically provides an extremely simple and accurate relocation of the pins or posts, without the usual necessity of remounting or rebolting of the base units or portions 23 to the plate 20. The latter procedures are often the source of misalignment of the posts.

More particularly, and with reference to unit 21, as shown in to FIGS. 2 and 3, the mounting plate 20 is provided with a pair of spaced clamping holes 30. The holes 30 are shown accurately located for mounting base 23 to the plate 20. In the illustrated embodiment of the invention, both holes 30 are shown as simple threaded openings which are located in precise alignment to receive the clamping bolts 24.

The base 23 of the unit 21 includes a depending edge lip 31, which abuts the adjacent edge of the station plate 20 to accurately lock the wall 25 relative to the threaded openings 30. Base 23 has openings 32 spaced for alignment with threaded openings 30. Bolts 24 pass downwardly through the openings 32 and thread into the threaded openings 30 in the station plate 20 to rigidly and fixedly attach the mounting base 23 to the station plate.

The upstanding outer wall 25 is integrally formed with the outer edge portion of the mounting base 23 and projects vertically upwardly therefrom. Wall 25 is shown generally overlying the outer edge of the station plate 20 and projects upwardly a short distance to define a rigid fixed mounting wall. Each receptacle 26 is similarly formed as an accurately formed opening in the outer half of the wall 25 with a finished surface, such that the receptacles are formed as essential duplicates of each other. The receptacle 26 is shown as a generally round opening with the outer face of the wall removed to define a slot 33 extending throughout the back edge of the receptacle. As most clearly shown in FIG. 3, the opening defining the receptacle 26 is formed at a slight outwardly canted angle to a vertical plane normal to the plate 20. Thus, with the post 16 in place, the post 16 is angled outwardly at a corresponding slight angle with respect to the plate 20.

Each post 16 and 17 is formed as shown as a rigid post member having a tapered outer portion 34 and a cylindrical portion base 28 of a length at least as long as the length of the receptacle 26 and a complementing cross-section. The backside of the post 16 is removed to define a concave cross-section which extends from the bottom of the post upwardly to a point spaced downwardly somewhat from the outer apex or point of the post. The lower portion 28 of post 16 is provided with a locking opening 35. The upstanding wall is provided with a correspondingly located locking unit 36 including a pin 37 releasably projecting into the opening 35. In the illustrated embodiment of the invention, locking unit 36 is a spring-loaded detent including an outer housing 38 fixedly secured within the wall 25. Pin 37 extends through the housing 38 with an inner end of a diameter corresponding to the diameter of the post locking opening 35. A spring, not shown, within the housing 38 urges the pin 37 inwardly into the receptacle for mating and locking engagement with opening 35. The outer end of the pin 37 has a conventional knurled knob 39 for retracting the pin 37 against the force of spring during insertion of the post 16.

The receptacles 26 are accurately formed as machine finished members with the center to center spacing accurately set and finished. Thus by moving of a corresponding finished post 16 from one receptacle 26 to the other, the operator, without any further adjustment, precisely varies the spacing of the posts 16 and 17 by the predetermined distance. Thus, in a practical application, the receptacles are spaced by the distance of one (1) inch. In addition, by precisely locating of the mounting base on the station plate 20, the spacing of the receptacles 26 in the spaced mounting units 21 and 22 is accurately controlled such that the movement of the posts in either one or both of the units 21 and 22 appropriately varies the post spacing by the desired one (1) inch.

The line operator can with the present invention rapidly set up the indexing conveyor 6 to the hole spacing of the bags 2.

Figure 4:
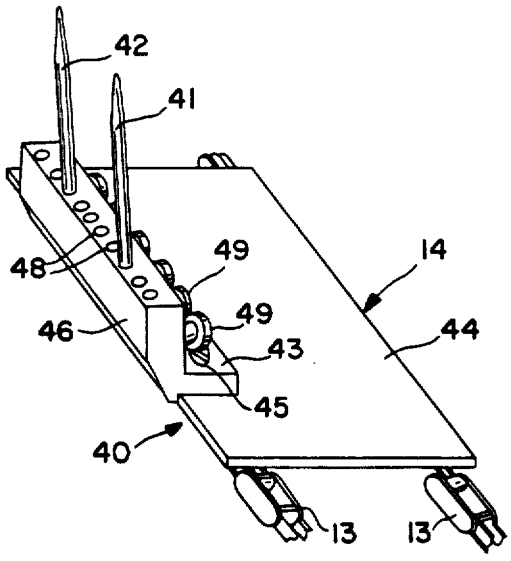
FIG. 4 is a pictorial view of a second embodiment of the invention with parts broken away and sectioned to clearly illustrate the changes.

Although the dual post units shown in FIGS. 1-3 provide a highly satisfactory post assembly for establishing a multiple of post spacing locations, the separate units 21 and 22 may be replaced with a single base unit having a substantial plurality of receptacles, such as illustrated in FIG. 4. In the embodiment of FIG. 4, a single mounting unit 40 is provided of a length in excess of the maximum length or spacing of a pair of posts 41 and 42 for the variety of bags 2 to be processed. The unit 40 includes a single mounting base 43 which is otherwise constructed in the same manner as the individual bases of FIGS. 1-3. Thus, base 43 includes a bottom mounting plate having the edge recessed for abutment with the outer edge of a station plate 44. A plurality of bolt units 45 pass through the base 43 and thread into appropriate openings, not shown, in plate 44 to rigidly affix the mounting unit 40 to the station plate. An integral upstanding receptacle wall 46 is an elongated mounting wall of length greater than maximum spacing of posts 41 and 42. The wall 46 includes a substantial plurality of post receptacles 48, and for purposes of illustration 10 equally spaced mounting receptacles are illustrated. In a practical construction, the receptacles are spaced on one (1) inch centers. The receptacles 48 are precisely formed to receive identical, matching spaced posts 41 and 42. The posts 41 and 42 may be constructed as in the first embodiment and are releasably secure within the corresponding opening by illustrated detent units 49, or any other suitable means.

The preferred embodiments with the machined or otherwise precisely formed receptacles in the mounting unit are accurately located on the stationary plates and provide a highly reliable and readily set post locating unit, which can be set with a minimum skill and attention by the operator. The changing from one pin spacing to another is thus reliably completed and with minimum time requirements because the operator merely withdraws the post and replaces it in a spaced receptacle to establish the desired post spacing.

Although the illustrated embodiment discloses the indexing support structure including receptacles to receive the post ends, other precise releasably couplings may be provided. For example, the coupling elements may be reversed with precisely formed peg members formed in the support wall structure in combination with complementing recesses or openings in the mounting ends of the posts. In any such structure, the coupling elements on the indexing unit must be precisely located and constructed to directly receive the complementing posts.

The present invention thus provides a mounting post structure including a mounting base unit for accurate interconnection to a conveyor support in combination with finished posts and precisely located and finished receptacles within which the posts are appropriately located to produce automatic predetermined spacing. A releasable latching unit is preferably provided to hold the post within the receptacles for receiving of a stack of bags with the prepunched holes in accordance with the spacing of the posts.

Various modes of carrying out the present invention are contemplated as being within the scope of the following claims particularly pointing out and distinctly claiming the subject matter which is regarded as the invention.

I claim:

1. A wicket indexed unit for sequentially aligning individual bag stacking units with a bag transfer unit for stacking plastic bags having spaced holes along a given edge portion of each bag, the plastic bags being formed with different hole-to-hole spacing, said bag stacking units each having spaced post aligned with said holes for retaining of the bags onto stacking units, said stacking units being secured to a conveyor, the improvement in said stacking units for mounting said spaced posts at each stacking unit, comprising a base unit having means for fixedly securing said stacking unit to said conveyor, said base unit being constructed with a plurality of longitudinally spaced post supports defining a plurality of different center-to-center locations to correspond to different spacing of the spaced holes in bags, each of said spaced post supports being an accurately finished support and said post supports being located on precise spaced centers of equal increments, a plurality of at least two stacking posts for each stacking unit, each of said posts having a mounting base portion complementing said post support for releasable attachment to said post supports for accurately locating said posts with precise center-to-center spacing corresponding to the holes in said plastic bags upon connection of said base portions to said post supports, and wherein said finished post supports constitute the sole means for precisely locating said posts on different center-to-center spacing.

2. The indexed unit of claim 1, wherein said post supports include vertically oriented receptacles having vertically oriented openings, and said posts having correspondingly shaped post ends complementing said openings.

3. The indexed unit of claim 2, including a lock member secured to said receptacle and movable into and from said openings, said posts having lock holes in said post ends located in alignment with said lock members in the assembled position.

4. The indexed unit of claim 1, including releasable lock units connected to said post supports and to said posts to releasably lock said posts to said post supports.

5. The unit of claim 1, wherein said base unit includes a mounting plate having bolt holes, said conveyor having station plates having corresponding space bolt openings, means for fixedly securing of said mounting plate to said station plate, said post supports being secured to said mounting plate.

6. A wicketing apparatus including an indexing conveyor and means to move said conveyor in predetermined equal steps for sequentially aligning stacking stations with a bag transfer unit for stacking bags having at least a pair of spaced holes and different bags having differently spaced holes with the spacing being in equal increments, comprising a station plate having a linear alignment edge, a mounting unit releasably clamped to said plate abutting said alignment edge, said mounting unit including an upstanding rigid wall of a substantial lateral thickness and having a plurality of accurately formed and essentially identical receptacles formed within said wall and projecting upwardly to a top opening in said wall, said receptacles being spaced longitudinally of said conveyor and having identical center-to-center dimensions corresponding to a change in the hole spacings in said bags, a plurality of rigid wicket posts having a mounting end corresponding to the configuration of said receptacles and adapted to be releasably mounted in said receptacles whereby said posts are spaced in accordance with said hole spacing by insertion into correspondingly spaced receptacles.

7. The apparatus of claim 6, wherein said upstanding wall includes separate locking means located in alignment with each post receptacle, said locking means being operable to releasably lock a wicket post to the corresponding receptacle.

8. The apparatus of claim 6, wherein said locking means includes a spring-loaded detent unit mounted within said vertical wall and having a spring-loaded pin urged into said receptacle and removed from said receptacle by pulling outwardly on said spring-loaded pin, each said wicket posts having an opening located within said mounting end for alignment with said locking pin for releasably locking of the wicket post within said receptacle.

9. The apparatus of claim 6, wherein each of said mounting unit includes a first mounting base and a second mounting base, each of said bases having said upstanding rigid wall with said receptacles formed therein and means separately securing said bases to said station plate.

10. The apparatus of claim 9, wherein each of said bases includes a mounting plate having bolt holes, said station plates having corresponding spaced bolt openings for fixedly securing of said mounting plate to said station plate.

11. The apparatus of claim 10, wherein said bolt openings in said station plates are threaded.

12. The apparatus of claim 6, wherein said receptacles are canted outwardly of said conveyor.

13. The apparatus of claim 6, wherein said mounting wall is a single integral member.

14. A mounting apparatus for a wicket indexing unit including a plurality of like support structures longitudinally spaced and moveable into a bag receiving station for receiving a stack of bags, each bag having at least a pair of spaced holes, first bags having holes spaced a precise distance defining a minimum hole location and second bags having holes spaced a precise distance different than said first bag by a predetermined increment and defining an intermediate hole location and third bags having holes spaced a precise distance different than said second bag by a distance equal to the increment of change in distance between said first and second bags and defining a maximum hole location, the improvement in said mounting apparatus for mounting of wicket posts to said support structures for processing a stream of either said first, second or third bags, comprising a base unit adapted to be rigidly affixed to said support structure and having post-receiving members located to selectively span the maximum and intermediate and minimum locations of said posts in accordance with said three different spacings of said holes in said three bags, said post-receiving members each including at least three spaced post supports and each being identically constructed, said three post supports having precise center-to-center locations in accordance with said incremental change between said bag holes, a plurality of wicket posts, each of said wicket posts having a mounting portion complementing said post support and each having an identical construction for providing a close fit with each post support to provide precise location of said wicket posts on the corresponding center whereby said center-to-center location of said wicket posts provide for precise spacing of the posts in accordance with the holes in said three bags.

* * * * *